United States Patent
Nilsson et al.

(10) Patent No.: US 6,587,047 B2
(45) Date of Patent: Jul. 1, 2003

(54) INTRUSION DETECTOR WITH POWER CONSUMPTION CONTROL AND METHOD FOR INTRUSION DETECTION

(75) Inventors: Stefan Nilsson, Gothenburg (SE); Göran Svedoff, Billdal (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,657

(22) Filed: Jan. 30, 2002

(65) Prior Publication Data

US 2002/0113696 A1 Aug. 22, 2002

Related U.S. Application Data

(63) Continuation of application No. PCT/SE00/01128, filed on May 30, 2000, now abandoned.

(51) Int. Cl.$^7$ .................................................. G08B 13/18
(52) U.S. Cl. ..................... 340/554; 340/541; 340/552; 340/565; 340/693.3
(58) Field of Search ............................... 340/554, 540, 340/541, 552, 565, 566, 522, 693.3, 693.2; 367/93, 94, 95, 136

(56) References Cited

U.S. PATENT DOCUMENTS

| | | | | |
|---|---|---|---|---|
| 4,625,199 A | * | 11/1986 | Pantus ........................ 340/522 |
| 5,424,711 A | * | 6/1995 | Muller et al. ................ 340/426 |
| 5,483,219 A | | 1/1996 | Aoki et al. |
| 5,506,567 A | | 4/1996 | Bichlmaier et al. |
| 5,684,458 A | * | 11/1997 | Calvarese .................... 340/554 |
| 5,729,193 A | * | 3/1998 | Grasmann et al. ........... 340/426 |
| 5,808,544 A | * | 9/1998 | Kani et al. ................... 340/426 |
| 5,856,778 A | * | 1/1999 | Kani et al. ................... 340/426 |
| 6,057,760 A | * | 5/2000 | Dauphin ..................... 340/552 |
| 6,198,385 B1 | * | 3/2001 | Kani et al. ................... 340/426 |
| 6,331,964 B1 | * | 12/2001 | Barone ........................ 367/128 |

FOREIGN PATENT DOCUMENTS

DE 19521511 C1 2/1997

* cited by examiner

*Primary Examiner*—Toan Pham
(74) *Attorney, Agent, or Firm*—Howrey Simon Arnold & White LLP

(57) ABSTRACT

An intrusion detector having a transmitter, receiver, detector, signal processor, and control unit is disclosed. The transmitter is able to transmit waves into a defined space and has a variable output power. The receiver is able to receive those waves after reflection. The detector is connected to the receiver and able to detect a signal based on a change in the waves after reflection, where the detected signal is representative of any motion in the defined space. The signal processor is able to process the detected signal in order to determine if an intrusion has occurred. The control unit is able to determine any change in the detected signal, and to increase the output power of the transmitter in response to such change. A method for performing such intrusion detection is also disclosed.

26 Claims, 3 Drawing Sheets

INTRUSION DETECTOR WITH POWER CONSUMPTION CONTROL AND METHOD FOR INTRUSION DETECTION

CROSS REFERENCE TO RELATED APPLICATIONS

The present application is a continuation of International Application No. PCT/SE00/01128, filed May 30, 2000 and published in the English language under PCT Article 21(2), now abandoned, that application being expressly incorporated herein by reference.

BACKGROUND OF INVENTION

1. Technical Field

The present invention relates to an intrusion detector with power consumption control. More specifically, the invention relates to a vehicle intrusion detector of the type based on Doppler effects of transmitted ultrasonic waves. The invention also relates to a method for intrusion detection.

2. Background Information

Intrusion detectors are known for creating unwanted false alarms. This is particularly true in vehicle intrusion detectors. Not only do they create a disturbance to people in the neighborhood and risk reducing or eliminating the power source, they also tend to result in common acceptance of active alarms, thereby decreasing the discouraging effect of alarms on potential burglars.

Detectors based on transmission of waves in, for example, the interior of a car have been developed and are known in the art. Typically, these systems receive waves reflected from the interior surroundings, demodulate them, pass them through a band pass filter, integrate the band pass signal, and compare the result with a predefined threshold value. If the threshold is exceeded, a signal is passed to a unit responsible for giving off an alarm. The waves are often ultrasonic sound waves or microwaves, and the demodulation performed is often based on the Doppler effect.

U.S. Pat. No. 5,856,778 to Kani et al. discloses a vehicle intrusion detector of this type that is an improvement of this wave transmission technique. The detector of Kani also includes an envelope detecting circuit for determining the level of the received ultrasonic signal. An alarm is generated only if this ultrasonic level exceeds a second predefined threshold value.

Intrusion alarms also face the problem of power consumption, especially in a vehicle or any other location where power is a scarce resource. A vehicle alarm is active only when the vehicle is parked and turned off, making it completely dependent upon the available battery power. If the vehicle is parked during a long period, it is crucial that power consumption is minimized, as the vehicle otherwise will be difficult to start.

In a detector such as the one described in U.S. Pat. No. 5,856,778, the issue of power consumption differs with the first issue of avoiding unwanted false alarms, as alarm accuracy depends on a relatively strong ultrasonic wave transmitter, and therefore increased power consumption. In order to overcome excessive power consumption, the supersonic transmitter is driven intermittently. However, this approach is not free from problems. First, the ability of the detector to detect any intrusion is greatly reduced, as it is active only part of the time. During inactive or intermittent periods, the detector is "blind", allowing intrusions, although short, to occur unnoticed. Secondly, the output frequency of the supersonic transmitter is unstabilized at the beginning of each active period, making it difficult to stabilize the detection operation of the detector. Thus, there is an increased risk of obtaining a false alarm due to this unstable period occurring in each active period.

A solution for this problem is provided in U.S. Pat. No. 5,483,219 to Aoki et al. Aoki discloses a device that invalidates the signal from the integrating circuit during a short period of each active period. Still, this is not a completely satisfactory solution. Further, it does not in any way improve the partial "blindness" of the detector.

As such there is a need for an intrusion detector that is able to combine a high detection level, good signal quality, and low power consumption.

SUMMARY OF INVENTION

The present invention provides an intrusion detector that overcomes the above problems, making it possible to continuously detect intrusions while simultaneously reducing power consumption. The invention also provides a vehicle intrusion detector with continuous transmission of waves having satisfactorily low power consumption.

These and other objects are achieved by a detector having a transmitter, receiver, detector, and control unit. The transmitter has a variable output power and is able to transmit waves into a defined space. The receiver is able to receive those waves after they reflect. The detector is connected to the receiver and is able to detect a signal based on a change in the waves after reflection, with the detected signal being representative of any motion in said defined space. The control unit is able to determine any change in the detected signal, as well as increase the output power of the transmitter in response to such change. They are also achieved by a method for intrusion detection involving transmitting waves into a defined space, receiving those waves after reflection, detecting a signal based on a change in the waves after reflection, where the reflected signal is representative of any motion in the defined space, controlling an output power of the wave transmission, and increasing the output power in response to a change in the detected signal.

When using a detector according to the invention, waves are transmitted into a defined space, and reflected back to the receiver (sensor), and the reflected waves are processed to obtain a signal corresponding to any change caused by motion in the space. The output power of the transmitter is variable, and a micro-controller (MCU) is arranged to increase the output power in response to a change in said signal.

This arrangement makes it possible to avoid driving the transmitter with a high power output, unless a signal representing motion in the vehicle has been detected. This in turn allows the power consumption to be lowered considerably without losing the continuous transmission of waves into the space.

According to a preferred embodiment, the detector includes a signal processor that is able to process the detected signal in order to securely determine if an intrusion has occurred. This processing can be of any suitable type, possibly of a previously known kind. It is typically dependent on a satisfactory signal-to-noise ratio in order to perform the analysis.

During normal functioning when no motion is detected, the transmitter output power is kept at a low level. A change in the reflected waves thus results in a very weak signal that cannot be securely analyzed in order to eliminate false alarms. As soon as the signal is detected, implying that any motion is present in the vehicle, and the transmitter output increased by the MCU, a significantly stronger detected signal is provided, considerably increasing the signal-to-noise ratio. This makes it possible to use advanced detection algorithms whereby the detected signal can be analyzed in order to securely determine whether or not the detected change is due to an intrusion. In the case of extreme weather conditions or traffic noise that result in high signal levels, those detected signals can be identified and removed by advanced algorithms without any significant increase in power consumption.

To further decrease power consumption, the signal processor can be deactivated during periods of low power transmission. The control unit is then arranged to activate the processor only when a change in the detected signal is determined, i.e., when the output power is increased.

One preferred way of embodying the output power control is to allow the control unit to raise the output power of the transmitter to a higher output level when the detected signal exceeds a predefined threshold.

Preferably, the control unit is then arranged to reset the output power of the transmitter to a lower output level after a predetermined period of time without any intrusion detection. Each time the detected signal exceeds the threshold, the intrusion detector will then be placed in an alert condition with a higher output power and a significantly increased possibility of identifying intrusions. If the detector signal increase is found to be a "false" alarm and no intrusion can be securely determined, the output power will be reset again, thereby effectively reducing power consumption.

The waves that are transmitted into the defined space can be any type of waves that can be carried by the medium filling the space. In the normal case of an air-filled space, possible wave types include sound waves and electromagnetic waves (e.g., microwaves or infrared waves).

In one embodiment of the invention primarily intended for use in a vehicle, the waves are ultrasonic waves. These waves have the advantage of being evenly distributed in the vehicle, while at the same time being confined by the vehicle walls and windows. Also, at least compared to microwaves, ultrasonic waves have a lower frequency, facilitating detection of any change in the reflected waves caused by an intrusion.

With microwaves, the transmitter generates a well-defined wave field, making good detection possible in defined areas. An advantage with using microwaves is that the detector is undisturbed by air movements, for example, movements due to an open window. On the other hand, the wave field must be carefully adjusted within the space. Otherwise, movements outside a window can be unintentionally detected.

As mentioned, infrared waves are another possible wave form. However, infrared waves are more sensitive to temperature changes and light phenomena typically introduced through the windows of a vehicle.

The signal detected by the detector in the reflected waves can be of different types, as the detection can be based on various types of phenomena occurring in the reflected wave field.

In one embodiment of the invention the detection is based on the Doppler effect. This technique is commonly known in intrusion detectors, including those found in vehicles as well as in other types of movement detectors. The technique can be utilized with ultrasonic waves as well as with electromagnetic waves. An advantage of using the Doppler effect is that the geometric form of the space is less influential on the result, which is advantageous in, e.g., a vehicle with a typically complex geometry. When using the Doppler effect in connection to microwaves, the detection can be based on pulse Doppler effect.

The detection of the Doppler signal can be performed with an envelope demodulator. The envelope of the reflected waves has the advantage of being phase and frequency independent, i.e., synchronization is not crucial. This in turn results in a greater freedom when placing the detector in a convenient space, such as a vehicle passenger compartment, especially in vehicle intrusion detectors, as it allows for a more compact design.

Instead of Doppler effect, a time discriminating detection can be performed. In the case of microwaves, a combination of these techniques can be performed, for example used in the pulse Doppler radar.

The detector according to the invention is primarily intended for the interior of a vehicle, such as a personal car, van, truck, etc., but could in principle be applied to any type of alarm system where low power consumption is desired.

BRIEF DESCRIPTION OF DRAWINGS

A currently preferred embodiment of the present invention will now be described in more detail, with reference to the accompanying drawings.

DETAILED DESCRIPTION

The embodiment of the invention which will be described in the following is related to a vehicle intrusion detector, where the Doppler effect on reflected ultrasonic waves is used to determine if an intrusion occurs. However, as was mentioned above, the invention is equally applicable in several other types of intrusion detectors.

Figure 1:
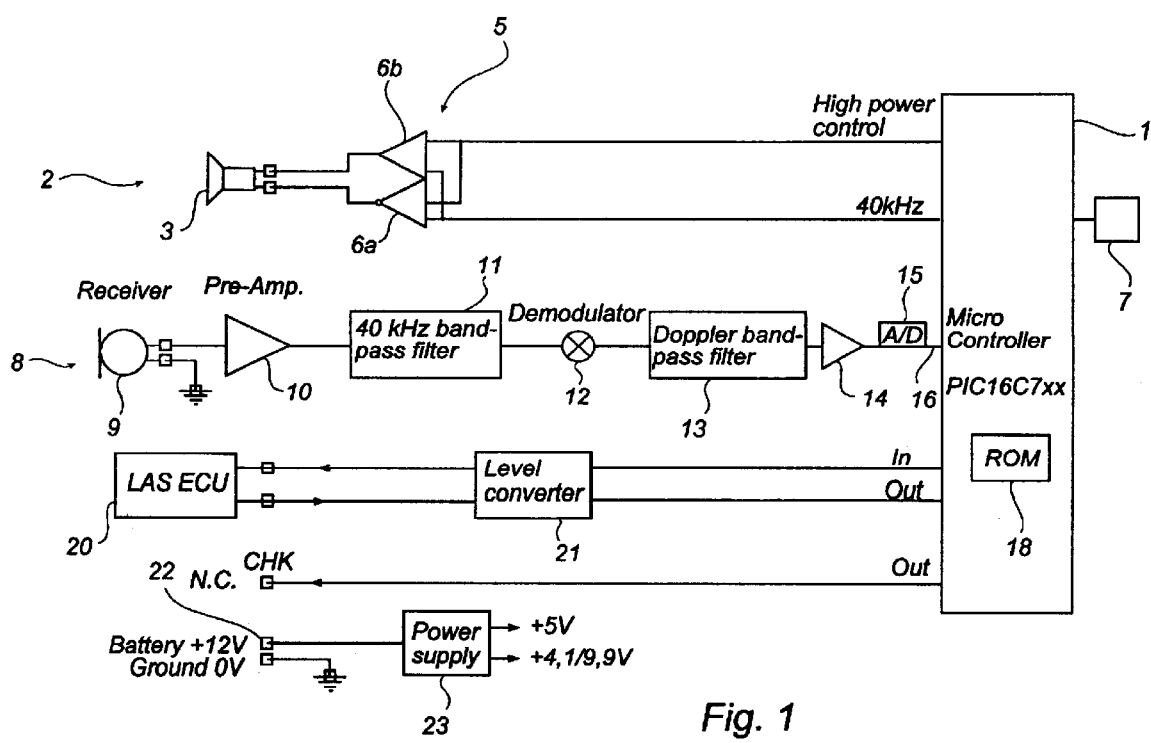
FIG. 1 is a block diagram of a vehicle intrusion system according to a preferred embodiment of the present invention.

Referring now to FIG. 1, the function of the intrusion detector can be controlled by a micro-controller unit (MCU) 1 such as a PIC16-series processor. Beginning with the transmitter side 2, a transmitter 3 is arranged to generate ultrasonic waves of a well-defined frequency. The transmitter 3 is driven by a drive unit 5 that supplies the transmitter 3 with a continuous square wave such as a 40 kHz square wave. This frequency is suitable for air filled compartments. The drive unit 5 comprises two buffers 6a, 6b, each being able to deliver a voltage of different levels. Preferably, one of the buffer outputs 6a is inverted, making it possible to supply the transmitter 2 with a voltage that is twice the voltage of each buffer 6a, 6b. The MCU 1 controls the voltage output of each buffer 6a, 6b, and also controls the buffer thresholds, making it possible to selectively deactivate one or both buffers. Additionally, the MCU 1 supplies the drive unit 5 with an oscillating signal from an external oscillating circuit 7.

Turning now to the receiver side 8, a receiver 9 such as a piezoelectric microphone is provided that is able to receive the ultrasonic waves generated by the transmitter after reflection against the interior walls and objects of the vehicle. The received signal is supplied to a low-noise amplifier, or pre-amplifier 10, which is in turn connected to a second order band bass filter 11 with a center frequency corresponding to the chosen transmitting frequency (in the present example, 40 kHz).

The band passed signal is then supplied to an envelope demodulator 12, and further to a very sharp Doppler band pass filter 13, preferably a fourth order band pass filter with cut off frequencies at about 30 Hz and about 300 Hz. Modulated signals in this range are typically representative of motion in the vehicle and result from a Doppler effect on the reflected ultrasonic waves.

Before the Doppler signal is supplied to the MCU 1, it is amplified by an end-amp 14 to reach a desired signal-to-noise ratio, and analog-to-digital (A/D) converted 15. Finally, the signal 16 is supplied to the MCU 1.

The MCU 1 is further provided with a signal processor in the form of software loaded into the ROM 18. The processor is able to perform signal processing on the signal 16 in order to securely determine whether the signal 16 represents an intrusion into the vehicle. The algorithms employed in this processing can be of various types and do not form part of the subject matter of this application.

The different levels of output power are chosen so that a higher level results in a detected signal 16 strong enough for the desired signal processing, while a lower level only results in a detected signal 16 strong enough for alerting the MCU 1. It is to be noted that when the transmitter is provided with the lower power level, the signal 16 is too weak for any satisfactory signal processing.

In one example of this construction, the MCU 1 controls the voltage level to about 4.1V or about 9.9V. Theoretically, this allows four different voltage levels being supplied to the transmitter: 4.1V (one buffer active 4.1V power supply), 8.2V (both buffers active 4.1V power supply), 9.9V (one buffer active 9.9V power supply), 19.8V (both buffers active 9.9V power supply). Normally, only the lowest and highest output levels are used (4.1V and 19.8V, respectively). This relation, where the higher level is approximately five times higher than the lower level, has been found satisfactory, but should not be seen as a restriction on the present invention.

In addition to the transmitting and receiving sides 2, 8, the MCU 1 is connected to the alarm system 20 of the vehicle 25 through a level converter 21. Thus any detected intrusion can easily be communicated to the alarm system 20.

Power is supplied by the vehicle battery 22, connected to a power supply unit 23. The power supply unit delivers stabilized voltage to the different components in order to achieve highest possible signal quality.

Figure 2:
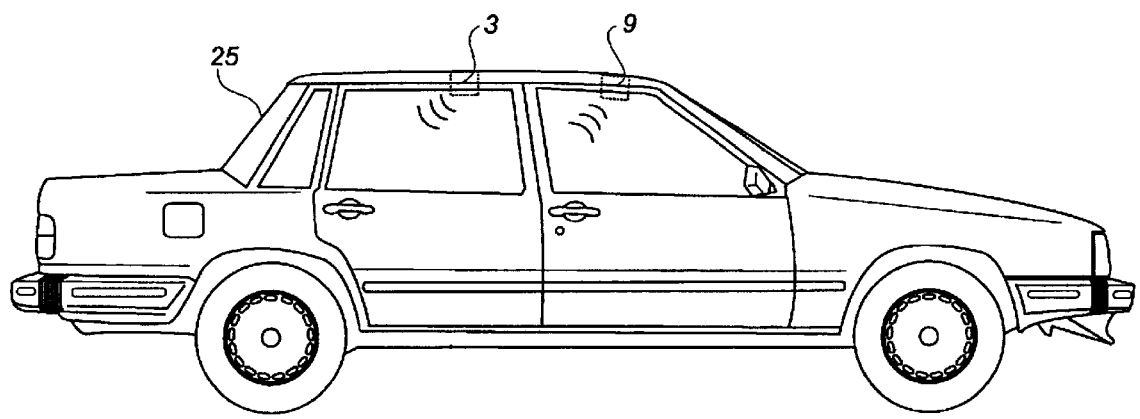
FIG. 2 is a schematic view of a personal car equipped with an intrusion detector according to the invention.

The placement of the transmitter 3 and receiver 9 in a vehicle 25 is illustrated in FIG. 2. The transmitter 3 is located substantially in the center of the ceiling, directed so that it can emit waves towards the back of the vehicle. The receiver 9 is located in the ceiling just above the windshield and is directed or positioned to receive waves reflected from the back of the vehicle. Obviously, a different placement is possible, and the best placement depends on the specific vehicle and the chosen transmitter/receiver.

Figure 3:
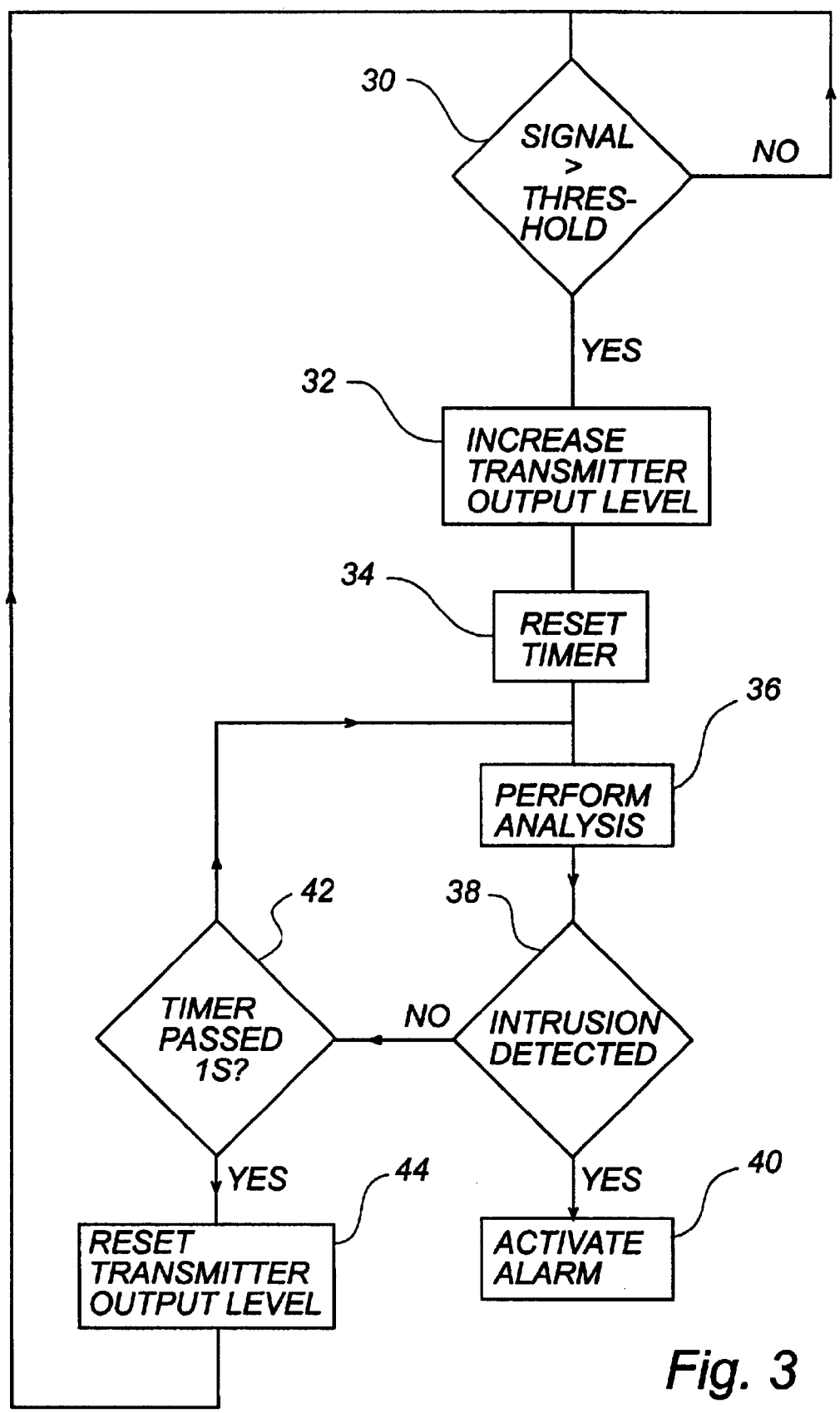
FIG. 3 is a flow diagram of the function of the micro-controller unit in FIG. 1.

According to the invention, the MCU 1 controls the output power of the transmitter in response to the signal delivered by the receiving side 8. This control is performed by a program loaded into the ROM 18 of the MCU 1. The flow chart of FIG. 3 illustrates the program. First, in step 30, the signal 16 is compared to a predefined threshold value. The comparison is performed continuously until the threshold is exceeded or the intrusion detector deactivated.

When the threshold is exceeded, the program control continues to step 32 where the transmitter output level is increased to the higher level (in the example, 19.8V). This results in a significantly stronger signal 16.

In step 34 a timer is reset, thereby marking the beginning of a time-limited loop, comprising steps 36, 38, 40 and 42.

The first of these steps, step 36, is the signal processing analysis mentioned above. As the transmitting power has now been increased, it is possible to make advanced calculations based on the signal 16, and thereby accurately determine whether an intrusion has occurred (step 38). When an intrusion is identified, an alarm is activated in step 40 by communicating with the alarm system 20.

If no intrusion is found in step 38, the time-limited loop continues through step 42 until a predefined time has passed, for example, one second. When the time limit has been passed, step 42 directs the program control to step 44 where the transmitter output level is decreased back to the lower level (4.1V). Finally, the program control returns to step 30 and awaits a new high detected signal 16.

With a detector according to the described embodiment, the power consumption can be reduced considerably. Although determination of intrusion is performed at an output voltage level of about 20V, securing a satisfactory signal processing, the transmitter is driven at an output voltage level around 4V during a completely dominating part of the time.

As an example of how the present invention reduces power consumption, consider a vehicle that is parked over night, for example, 10 hours (or 36000 seconds). If conditions and passing traffic causes 100 detected Doppler changes in the reflected ultrasonic waves (equivalent to 100 seconds of high output), this means that the higher output level only is employed during $\frac{1}{360}$ of the night. Such implications in terms of power reduction are, of course, easily understood.

The present invention should not be considered as being limited to the above-described embodiments, but also includes all possible variations covered by the scope defined by the appended claims.

What is claimed is:

1. An intrusion detector comprising:
    a transmitter able to transmit waves into a defined space, said transmitter having a variable output power,
    a receiver able to receive said waves after reflection,
    a detector connected to said receiver and able to detect a signal based on a change in said waves after reflection, said detected signal being representative of any motion in said defined space, and
    a control unit able to determine any change in said detected signal, and to increase said output power of the transmitter in response to such change.

2. The intrusion detector according to claim 1, further comprising a signal processor able to process said detected signal in order to securely determine if an intrusion has occurred.

3. The intrusion detector according to claim 2, wherein said control unit is able to activate said processor only when said output power is increased.

4. The intrusion detector according to claim 1, wherein said control unit is able to control the output power of the transmitter to a higher output level when said detected signal exceeds a predefined threshold value.

5. The intrusion detector according to claim 4, wherein said control unit is able to reset the output power of the transmitter to a lower output level after a predetermined period of time without any intrusion detection.

6. The intrusion detector according to claim 1, wherein said waves are ultrasonic waves.

7. The intrusion detector according to claim 1, wherein said waves are electromagnetic waves.

8. The intrusion detector according to claim 1, wherein said detector is able to detect a Doppler signal based on a Doppler effect on said waves.

9. The intrusion detector according to claim 8, wherein said detector includes an envelope demodulator.

10. The intrusion detector according to claim 1, wherein said detector is able to detect a time discriminated signal, based on time discrimination of said waves.

11. The intrusion detector according to claim 1, wherein said transmitter is powered by a drive unit connected to a voltage supply and oscillating circuit, said drive unit thereby providing a square wave signal output with an amplitude level depending on the output level of said voltage supply.

12. The intrusion detector according to claim 11, said drive unit further comprising two synchronized square wave signal outputs, of which at least one is connected to an inverter, said transmitter being connected to the resultant of said signal outputs.

13. A vehicle provided with an intrusion detector according to claim 1.

14. The intrusion detector according to claim 1 wherein the increase in output power is from a non-zero value to a larger non-zero value.

15. The intrusion detector according to claim 14 wherein said non-zero value provides a first level of intrusion-detection capability, and wherein said larger non-zero value provides an improved level of intrusion-detection capability.

16. A method for intrusion detection, comprising the steps of:

transmitting waves into a defined space, receiving said waves after reflection, detecting a signal based on a change of said waves after reflection, said reflected signal being representative of any motion in said defined space, controlling an output power of the wave transmission, and increasing said output power in response to a change in said detected signal.

17. The method according to claim 16, further comprising the step of signal processing the detected signal whereby a secure determination of an intrusion is provided.

18. The method according to claim 17, further comprising the step of performing the signal processing only when said output power is increased.

19. The method according to claim 16, further comprising the step of increasing said output power to a higher output level when said detected signal exceeds a predefined threshold value.

20. The method according to claim 19, further comprising the step of resetting the output power of the transmitter to a lower output level after a predetermined period of time without any intrusion detection.

21. The method according to claim 16 wherein said waves are ultrasonic waves.

22. The method according to claim 16, wherein said waves are electromagnetic waves.

23. The method according to claim 16, wherein said detection is based on a Doppler effect on said waves.

24. The method according to claim 16 wherein said detection is based on time discrimination of said waves.

25. The method according to claim 16, further comprising the step of increasing said output power from a non-zero value to a larger non-zero value.

26. The method according to claim 25 wherein said non-zero value provides a first level of intrusion-detection capability, and wherein said larger non-zero value provides an improved level of intrusion-detection capability.

* * * * *